(12) United States Patent
Medasani et al.

(10) Patent No.: US 8,532,402 B2
(45) Date of Patent: Sep. 10, 2013

(54) IMAGE REGISTRATION

(75) Inventors: Swarup S. Medasani, Thousand Oaks, CA (US); Yuri Owechko, Newbury Park, CA (US); Jose M. Molineros, Encino, CA (US); Dmitriy Korchev, Irvine, CA (US)

(73) Assignee: The Boeing Company, Chicago, IL (US)

( * ) Notice: Subject to any disclaimer, the term of this patent is extended or adjusted under 35 U.S.C. 154(b) by 160 days.

(21) Appl. No.: 13/166,357

(22) Filed: Jun. 22, 2011

(65) Prior Publication Data

US 2012/0328203 A1    Dec. 27, 2012

(51) Int. Cl.
*G06K 9/62* (2006.01)

(52) U.S. Cl.
USPC ............................................... 382/225

(58) Field of Classification Search
USPC .................. 382/151, 209, 225, 276, 294
See application file for complete search history.

(56) References Cited

U.S. PATENT DOCUMENTS

| 7,961,982 | B2* | 6/2011 | Sibiryakov et al. | 382/294 |
| 2012/0274505 | A1* | 11/2012 | Pritt et al. | 342/25 A |

OTHER PUBLICATIONS

EP search report dated Oct. 17, 2012 regarding application 12173310.9-2218, applicant reference P54992EP/RGH, applicant the Boeing Company, 11 pages.

Venkateswar et al., "Hierarchical Stereo and Motion Correspondence Using Feature Groupings," International Journal of Computer Vision, vol. 15, No. 3, Jul. 1995, 26 pages.
Xuan et al., "A Point Pattern Matching Algorithm Based on Minimize Spanning Tree and Fiedler Vector," 1st International Confrence on Information Science and Engineering, Dec. 2009, pp. 1095-1099.
Zahn, "Graph-Theoretical Methods for Detecting and Describing Gestalt Clusters," IEEE Transactions on Computers, vol. C-20, No. 1, Jan. 1971, pp. 68-86.
Zahn, "An Algorithm for Noisy Template Matching," IFIP Information Processing Congress, Jan. 1974, pp. 698-701.
Zhang et al., "A Robust Technique for Matching Two Uncalibrated Images Through the Recovery of the Unknown Epipolar Geometry," AI Journal, vol. 78, May 1994, 44 pages.
Torr, "MLESAC: A New Robust Estimator with Application to Estimating Image Geometry", Computer Vision and Image Understanding, 78, pp. 138-156 (2000).
Trier et al., "Feature Extraction Methods for Character Recognition—A Survey", Pattern Recognition, vol. 29 No. 4, pp. 641-692, 1996, Elsevier.
Fischler et al., "Random Sample Consensus: A Paradigm for Model Fitting with Applications to Image Analysis and Automated Cartography", Graphics and Image Processing, ACM 1981, pp. 381-396.

(Continued)

*Primary Examiner* — Daniel Mariam
(74) *Attorney, Agent, or Firm* — Yee & Associates, P.C.

(57) ABSTRACT

A method and apparatus for processing images. Clusters of first features identified in a first image are identified. Each cluster in the clusters comprises a first group of features from the first features. A transformation for registering each cluster in the clusters with a corresponding cluster comprising a second group of features from second features identified in a second image is identified using an initial correspondence between the first features in the first image and the second features in the second image. A set of clusters from the clusters of the first features is identified using the transformation identified for each cluster. A final transformation for registering the first image with the second image is identified using the set of clusters.

18 Claims, 12 Drawing Sheets

(56) References Cited

OTHER PUBLICATIONS

Umeyama, Least Squares Estimation of Transformation Parameters Between Two Point Patterns, IEEE Transactions on Pattern Analysis and Machine Intelligence, vol. 13, No. 4, Apr. 1991, pp. 376-381.

Megret et al., "A Survey of Spatio-Temporal Grouping Techniques", pp. 1-17, MDA9049-6C-1250 Aug. 2002.

Kuhl, "Elliptic Fourier Features of a Closed Contour", Computer Graphics and Image Processing, 18, pp. 236-258, (1982).

"Line Detection by Hough transformation", Apr. 20, 2009, pp. 1-7, retrieved May 20, 2011 http://www.cvmt.dk/education/teaching/f09/VGIS8/AIP/hough_09gr820.pdf.

Steger, "An Unbiased Detector of Curvilinear Structures", IEEE Transactions on Pattern Analysis and Machine Intelligence, vol. 20, No. 2, Feb. 1998, pp. 113-126.

Vincent et al., "Detecting Planar Homographies in an Image Pair", pp. 1-6, retrieved May 20, 2011 http://citeseerx.ist.psu.edu/viewdoc/download?doi=10.1.1.86.6934&rep=rep1&type=pdf.

Zuliani et al., "The Multiransac Algorithm and its Application to Detect Planar Homographies", IEEE International Conference on Image Processing, 2005. ICIP 2005, Issue Date: Sep. 11-14, 2005, pp. 1-4.

Ozuysal et al., "Fast Keypoint Recognition in ten Lines of Code", pp. 1-8, retrieved May 20, 2011 http://cvlab.epfl.ch/~lepetit/papers/ozuysal_cvpr07.pdf.

Lepetit et al., "Keypoint Recognition using Randomized Trees", pp. 1-27, retrieved May 20, 2011 http://cvlab.epfl.ch/publications/publications/2006/LepetitF06a.pdf Amit et al., "Shape Quantization and Recognition with Ramdomized Trees", Aug. 1996, pp. 1-56, http://citeseer.ist.psu.edu/viewdoc/download;jsessionid=B77BC87027AFFB86CAC365165912FD-14?doi=10.1.1.102.5478&rep=rep1&type=pdf.

Nister et al., "Scalable Recognition with a Vocabulary Tree", 2006 IEEE Computer Society Conference on Computer Vision and Pattern Recognition, 2006, pp. 2161-2168.

Wang et al., "A Robust Approach for Automatic Registration of Aerial Images with Untextured Aerial LiDAR Data", pp. 1-8, retrieved May 20, 2011 http://graphics.usc.edu/~luwang/pdf/lu_CVPR09.pdf.

Ke et al., "Transforming Camera Geometry to a Virtual Downward-Looking Camera: Robust Ego-Motion Estimation and Ground-Layer Detection", 2003 IEEE, pp. 1-8.

Magarey et al, "Multiresolution Stereo Image Matching Using Complex Wavelets", Proceedings Fourteenth International Conference on Pattern Recognition, 1998, Aug. 16-20, 1998, pp. 4-7 vol. 1.

Pintsov, "Invariant pattern recognition, symmetry, and Radon transforms", J. Opt. Soc. Am. A/vol. 6/No. 10/Oct. 1989, pp. 1-11.

Payne et al., "Registration of synthetic aperture radar images using a multiresolution Radon transform", pp. 1-12, retrieved May 20, 2011 http://www.cssip.edu_au/~jfam/papers/spie99_ei21.p.

\* cited by examiner

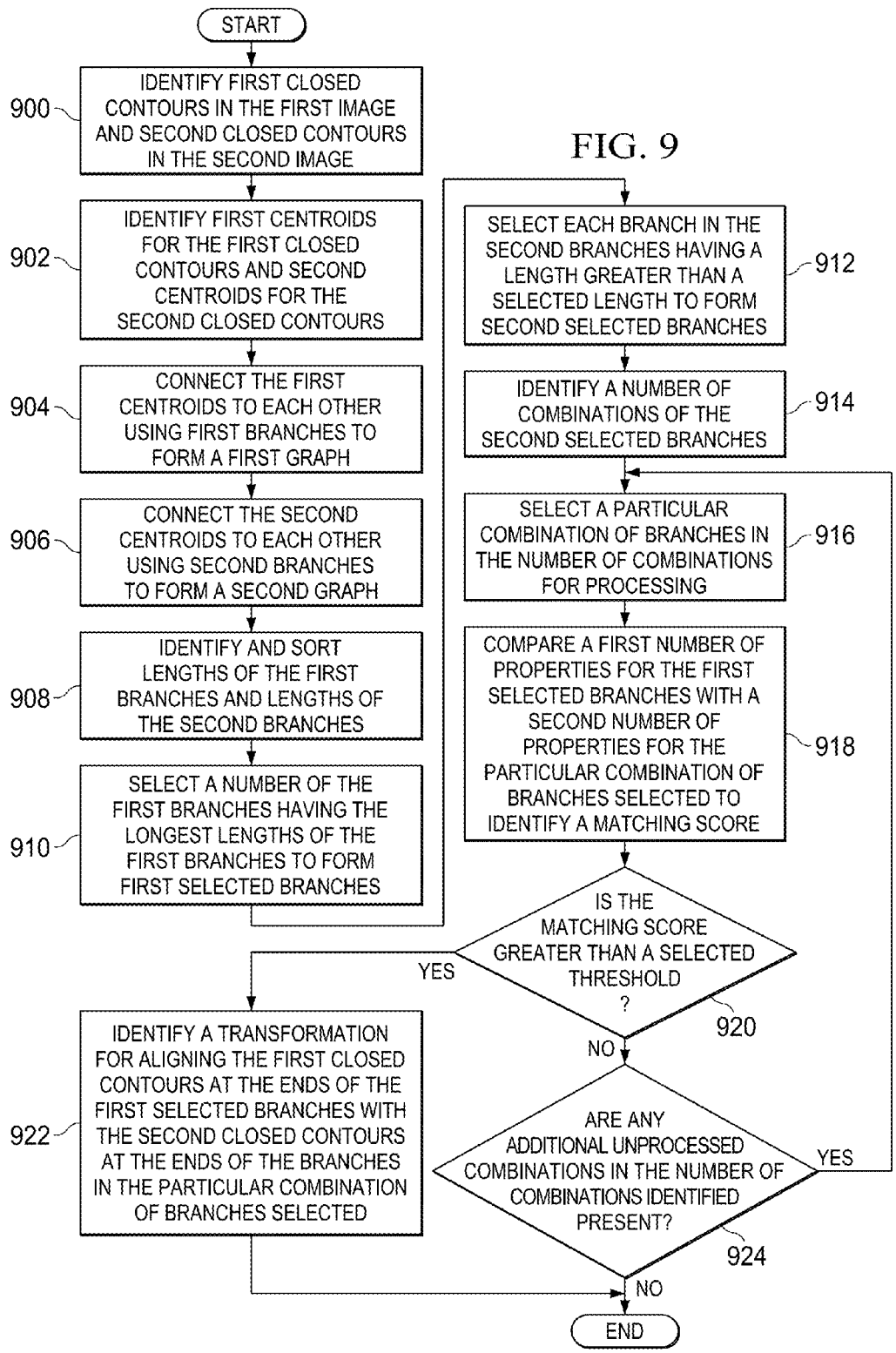

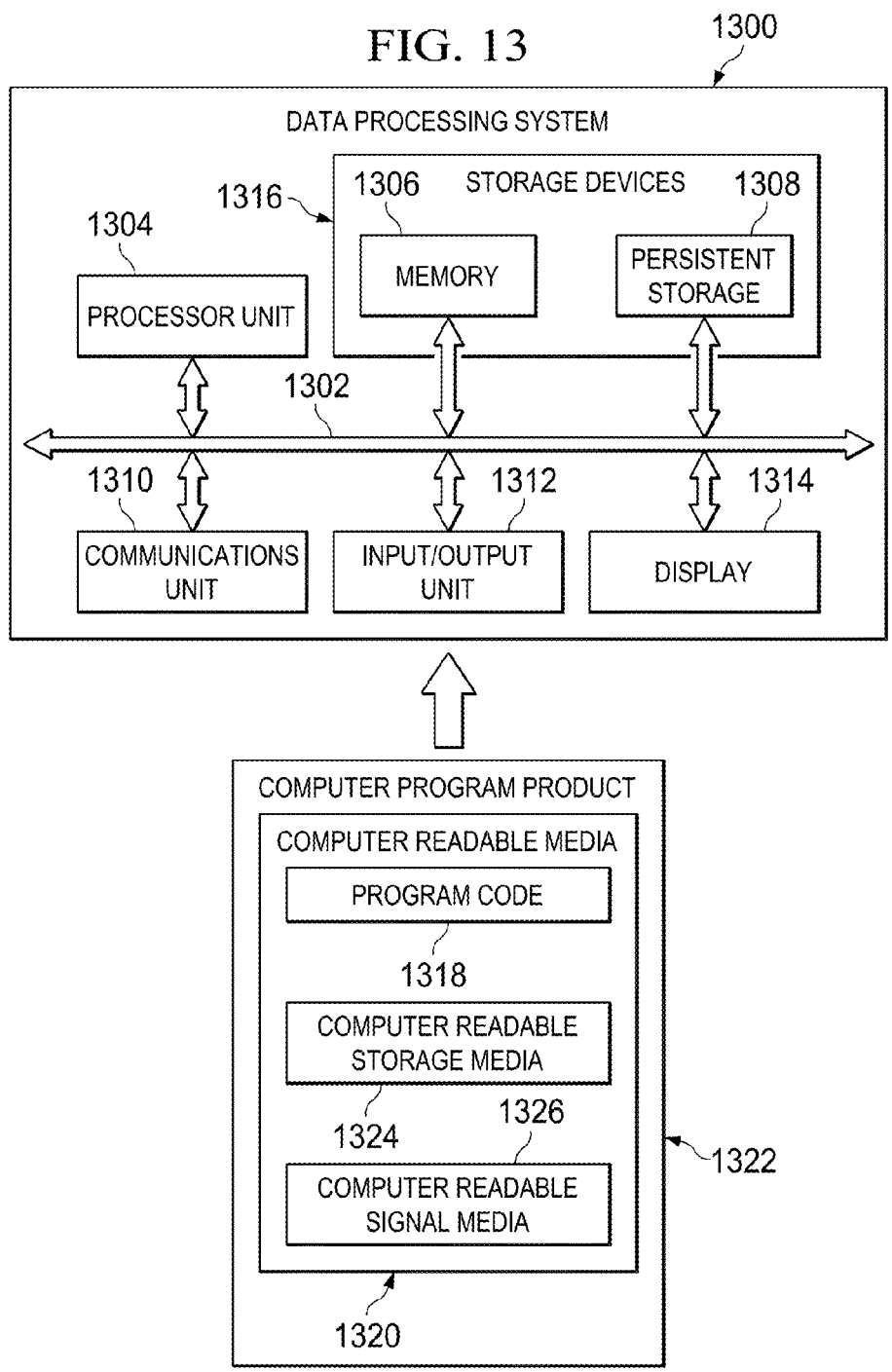

IMAGE REGISTRATION

BACKGROUND INFORMATION

1. Field

The present disclosure relates generally to processing images and, in particular, to registering synthetic aperture radar (SAR) images. Still more particularly, the present disclosure relates to a method and apparatus for registering synthetic aperture radar images that have been orthorectified.

2. Background

Images are used in performing various types of operations. These operations may include, for example, without limitation, object recognition, object tracking, and/or other suitable types of operations. Oftentimes, image registration is performed prior to performing these operations. Image registration is the alignment of images of a same scene generated at different times, from different viewpoints, and/or by different sensors.

Feature-based image registration is an example of one type of image registration. Feature-based registration transforms a first image of a scene such that features in the first image align with the same features in a second image of the same scene. The second image may also be referred to as a reference image or a source image.

With feature-based image registration, different types of transformation models may be used to transform the first image to align the first image with the reference image. One type of transformation model is a linear transformation. A linear transformation may include, for example, without limitation, translation, rotation, scaling, and/or other suitable types of affine transformations. An affine transformation is any transformation that preserves collinearity between points and ratios of distances between points on a line.

Feature-based image registration may be used with different types of images. These different types of images may include, for example, without limitation, visible spectrum images, optical images, infrared images, radar images, synthetic aperture radar (SAR) images, and other suitable types of images.

Typically, synthetic aperture radar images are orthographically rectified prior to performing image registration. This process may also be referred to as orthorectification. Orthorectification is the removal of geometric distortions from an image such that the scale of the image is substantially uniform. These geometric distortions may be caused by tilt of the sensor that generated the image, terrain relief, lens distortion, and/or other suitable sources of distortion. Images that have been orthographically rectified may be referred to as orthorectified images.

Feature-based image registration of orthorectified images may include using an orthographic transformation that translates and/or rotates an orthorectified image to align with a reference image. The reference image is also orthorectified. Currently-available methods for performing feature-based image registration of synthetic aperture radar images may not be as accurate as currently-available methods for feature-based image registration of visible spectrum images.

For example, a greater amount of noise may be present in synthetic aperture radar images as compared to visible spectrum images. This greater amount of noise may make the identification of features in synthetic aperture radar images less accurate as compared to the identification of features in visible spectrum images, using currently-available methods for identifying features in images. As a result, currently-available methods for feature-based image registration of synthetic aperture radar images may be less accurate than desired.

Therefore, it would be advantageous to have a method and apparatus that takes into account at least some of the issues discussed above, as well as possibly other issues.

SUMMARY

In one advantageous embodiment, a method for processing images is provided. Clusters of first features identified in a first image are identified. Each cluster in the clusters comprises a first group of features from the first features. A transformation for registering each cluster in the clusters with a corresponding cluster comprising a second group of features from second features identified in a second image is identified using an initial correspondence between the first features in the first image and the second features in the second image. A set of clusters from the clusters of the first features is identified using the transformation identified for each cluster. A final transformation for registering the first image with the second image is identified using the set of clusters.

In another advantageous embodiment, a method for registering images is provided. First features in a first image in the images and second features in a second image in the images are identified. An initial transformation is identified for registering the first image with the second image using the first features and the second features. An initial correspondence between the first features in the first image and the second features in the second image is identified using the initial transformation for registering the first image with the second image. Clusters of the first features in the first image are identified using a minimum spanning tree formed using the first features. Each cluster in the clusters comprises a first group of features from the first features. A transformation for registering each cluster in the clusters with a corresponding cluster comprising a second group of features from the second features identified in the second image is identified using the initial correspondence. A cluster in the clusters is added to a set of clusters when a projection error for the transformation identified for the cluster is less than a selected threshold. A final transformation for registering the first image with the second image is identified using features in the set of clusters and a random sample consensus algorithm. The first image is registered with the second image using the final transformation.

In yet another advantageous embodiment, an apparatus comprises an image processing module. The image processing module is configured to identify clusters of first features identified in a first image. Each cluster in the clusters comprises a first group of features from the first features. The image processing module is further configured to identify a transformation for registering each cluster in the clusters with a corresponding cluster comprising a second group of features from second features identified in a second image using an initial correspondence between the first features in the first image and the second features in the second image. The image processing module is further configured to identify a set of clusters from the clusters of the first features using the transformation identified for each cluster. The image processing module is further configured to identify a final transformation for registering the first image with the second image using the set of clusters.

The features, functions, and advantages can be achieved independently in various embodiments of the present disclo-

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 9 is an illustration of a flowchart of a process for identifying an initial transformation for registering a first image with a second image in accordance with an advantageous embodiment;

FIG. 13 is an illustration of a data processing system in accordance with an advantageous embodiment.

DETAILED DESCRIPTION

Figure 1:
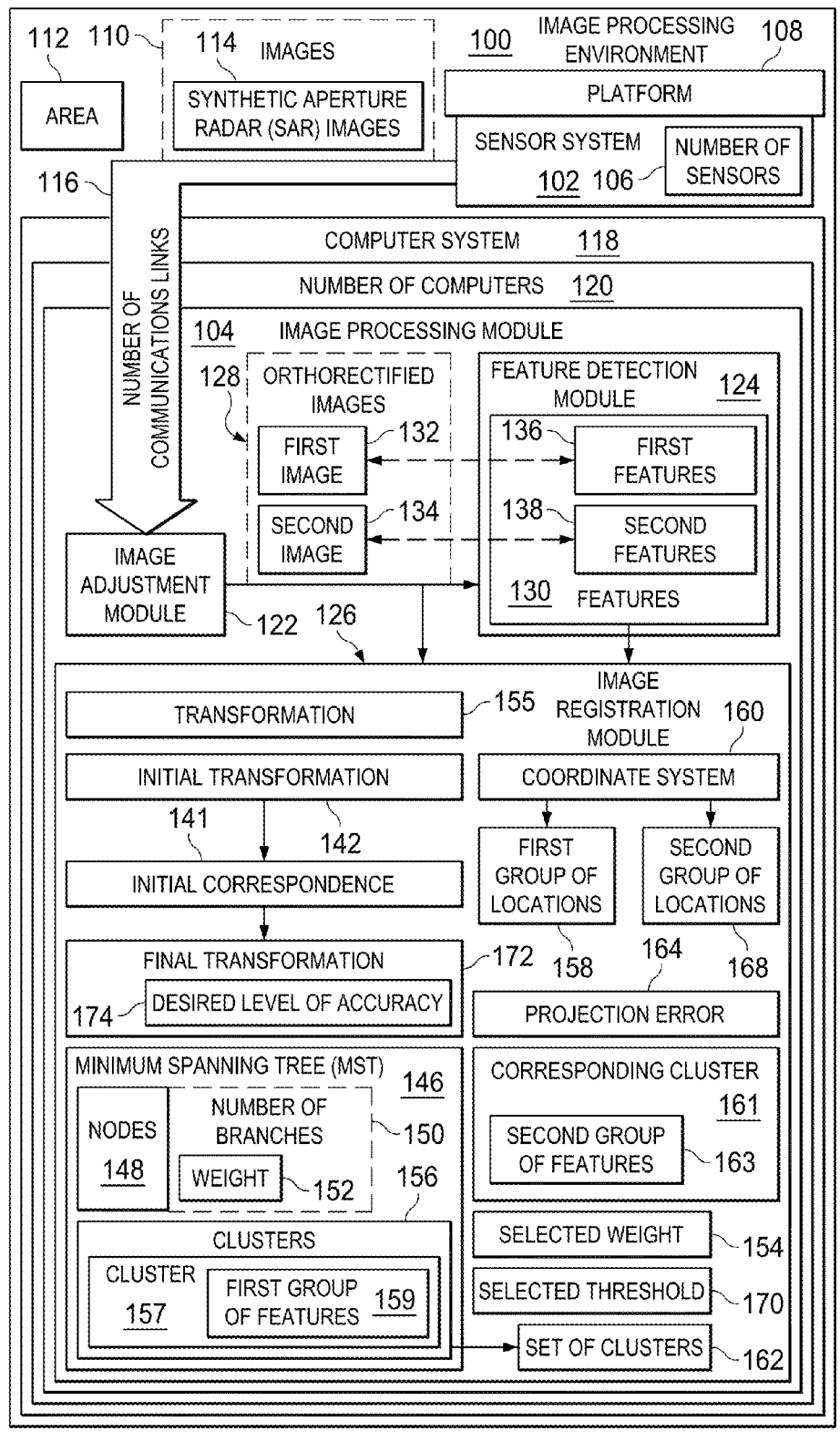
FIG. 1 is an illustration of an image processing environment in the form of a block diagram in accordance with an advantageous embodiment.

The different advantageous embodiments recognize and take into account a number of different considerations. For example, the different advantageous embodiments recognize and take into account that synthetic aperture radar (SAR) images may have more noise than desired. Synthetic aperture radar imaging systems send pulses of electromagnetic radiation. These pulses are also referred to as electromagnetic signals. These electromagnetic signals are directed at an area, such as, for example, an area of terrain, a neighborhood, a section of a forest, a portion of a city, a plant, or some other suitable type of area.

The different advantageous embodiments recognize and take into account that at least a portion of the electromagnetic signals is reflected off of a surface of the area when these electromagnetic signals encounter the surface. The electromagnetic waves that are reflected off the surface may be referred to as backscatter, scattered electromagnetic waves, scattered electromagnetic signals, echo waves, or echoes.

Synthetic aperture radar imaging systems are configured to detect these scattered electromagnetic signals and generate synthetic aperture radar images. This detection is referred to as coherent detection. This type of detection is performed on the scattered electromagnetic signals and is a type of detection that allows both amplitude information and phase information to be captured for the signals. The different advantageous embodiments recognize and take into account that using coherent detection produces an undesired level of non-Gaussian noise in the synthetic aperture radar images that are generated.

Additionally, the different advantageous embodiments recognize and take into account that the reflectivity of electromagnetic signals off of surfaces may depend on the angles at which the electromagnetic signals are directed towards the surface. In this manner, synthetic aperture radar images are often anisotropic. In other words, the appearance of a scene in synthetic aperture radar images may vary, depending on the angles at which the electromagnetic signals are sent towards the area by the synthetic aperture radar imaging systems.

The different advantageous embodiments recognize and take into account that the non-Gaussian noise present in synthetic aperture radar images and the anisotropism of these types of images may make processing synthetic aperture radar images more difficult as compared to processing visible spectrum images. In particular, image registration of synthetic aperture radar images may be more difficult as compared to image registration of visible spectrum images.

For example, currently available methods for image registration of synthetic aperture radar images typically use a feature detection algorithm and an algorithm for estimating a transformation model for registering the synthetic aperture radar images. The transformation model is estimated based on the detection of a feature in the synthetic aperture radar images.

However, the different advantageous embodiments recognize and take into account that these currently-available methods for image registration of synthetic aperture radar images may not have a desired level of accuracy. In particular, the amount of noise present in synthetic aperture radar images may make the detection of features in these images using currently-available feature detection algorithms less accurate and less reliable than desired. As a result, image registration of these synthetic aperture radar images may be less accurate than desired.

The different advantageous embodiments recognize and take into account that accurate image registration of synthetic aperture radar images may be desirable when performing object recognition. For example, the different advantageous embodiments also recognize and take into account that when these types of images are registered with an accuracy less than a desired level of accuracy, a number of false identifications of objects may be increased and/or a number of identifications of objects that are not objects of interest may be increased.

As one illustrative example, without a desired level of accuracy for registering synthetic aperture radar images, shadows may be more often falsely identified as objects of interest. Further, the different advantageous embodiments recognize and take into account that a less than desired level of accuracy for registering synthetic aperture radar images may make it more difficult than desired to track objects in these images over time.

Additionally, the different advantageous embodiments recognize and take into account that using synthetic aperture radar images of various portions of a scene to form a larger image of the scene may not be possible when the level of accuracy for registering these types of images is less than desired.

Thus, the different advantageous embodiments provide a method and apparatus for registering images. In one advantageous embodiment, a method for processing images is provided. Clusters of first features identified in a first image are identified. Each cluster in the clusters comprises a first group of features from the first features. A transformation for registering each cluster in the clusters with a corresponding cluster comprising a second group of features from second features identified in a second image is identified using an initial correspondence between the first features in the first image and the second features in the second image. A set of clusters from the clusters of the first features is identified using the transformation identified for each cluster. A final transformation for registering the first image with the second image is identified using the set of clusters.

With reference now to FIG. 1, an illustration of an image processing environment in the form of a block diagram is depicted in accordance with an advantageous embodiment. Image processing environment 100 includes sensor system 102 and image processing module 104.

In these illustrative examples, sensor system 102 may comprise number of sensors 106. As used herein, "a number of items" means one or more items. For example, "a number of sensors" means one or more sensors. Number of sensors 106 may include, for example, without limitation, at least one of an optical camera, an infrared camera, a radar imaging system, a synthetic aperture radar imaging system, and other suitable types of sensors.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

As depicted, sensor system 102 is associated with platform 108. A first component, such as sensor system 102, may be considered to be associated with a second component, such as platform 108, by being secured to the second component, bonded to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, platform 108 may be selected from one of a mobile platform, a stationary platform, a land-based structure, an aquatic-based structure, a space-based structure, an aerial vehicle, an aircraft, an unmanned aerial vehicle, a surface ship, a tank, a personnel carrier, a train, a spacecraft, a space station, a satellite, a submarine, an automobile, a power plant, a bridge, a dam, a manufacturing facility, and a building.

As depicted, sensor system 102 is configured to generate images 110 of area 112. In these illustrative examples, area 112 may be an area under platform 108. Further, in these illustrative examples, images 110 take the form of synthetic aperture radar (SAR) images 114.

Sensor system 102 is configured to send images 110 to image processing module 104 over number of communications links 116. Number of communications links 116 may include at least one of a wireless communications link, a wired communications link, an optical communications link, and some other suitable type of communications link.

In these depicted examples, image processing module 104 may be implemented using hardware, software, or a combination of the two. As one illustrative example, image processing module 104 may be implemented in computer system 118. Computer system 118 comprises number of computers 120. When more than one computer is present in computer system 118, these computers may be in communication with each other.

Number of computers 120 may be in locations on platform 108 and/or remote to platform 108. In one illustrative example, all of number of computers 120 may be located on platform 108. In another illustrative example, a portion of number of computers 120 may be located on platform 108, while another portion of number of computers 120 may be located at a ground station remote to platform 108.

In these illustrative examples, image processing module 104 may comprise image adjustment module 122, feature detection module 124, and image registration module 126. Image adjustment module 122 is configured to orthographically rectify images 110 received from sensor system 102 to form orthorectified images 128.

Orthographically rectifying images 110 includes removing geometric distortions from images 110 such that the scale for each image in images 110 is substantially uniform. The geometric distortions present in an image in images 110 may be caused by a tilt of the sensor in number of sensors 106 that generated the image, terrain relief in area 112, lens distortion of the sensor, and/or other suitable sources of distortion.

As depicted, image adjustment module 122 sends orthorectified images 128 to feature detection module 124. Feature detection module 124 is configured to identify features 130 in orthorectified images 128. Feature detection module 124 may identify features 130 using at least one of a Steger algorithm, a Canny line detection algorithm, an edge detection algorithm, a Hough transform, a scale-invariant feature transform (SIFT), a speeded up robust features detector (SURF detector), a Kanade-Lucas-Tomasi tracker (KLT), a line detection algorithm, and other suitable types of algorithms.

As one illustrative example, orthorectified images 128 include first image 132 and second image 134. First image 132 and second image 134 may have been generated by sensor system 102 at different times, by different sensors within number of sensors 106, and/or from different viewpoints.

First image 132 and second image 134 are examples of two images that are to be registered using image registration module 126. In particular, first image 132 is to be registered with second image 134 based on first features 136 and second features 138. Second image 134 may also be referred to as a reference image or a source image.

First features 136 in first image 132 and second features 138 in second image 134 are identified using feature detection module 124. The features in first features 136 and second features 138 may be selected from at least one of lines, shapes, and other suitable types of features.

Feature detection module 124 sends features 130 identified in orthorectified images 128 to image registration module 126. Image registration module 126 also receives orthorectified images 128 from image adjustment module 122.

Image registration module 126 registers first image 132 with second image 134 to align first image 132 with second image 134. In particular, registering first image 132 with second image 134 aligns first features 136 in first image 132 with second features 138 in second image 134. This alignment may not be a substantially perfect alignment.

In other words, when first image 132 is registered with second image 134, portions of first features 136 may substantially overlap with second features 138. Other portions of first features 136, however, may not overlap with second features 138 or may have less overlap than the portions of first features 136 that substantially overlap with second features 138. The amount of overlap between first features 136 and second features 138 may be used in determining a level of accuracy for registering first image 132 with second image 134.

In these illustrative examples, image registration module 126 is configured to identify initial correspondence 141 between first features 136 and second features 138. Initial correspondence 141 is a one-to-one correspondence in these depicted examples.

In other words, each feature in first features 136 in first image 132 has a corresponding feature in second features 138 in second image 134. Further, each feature in second features 138 corresponds to a feature in first features 136. In some illustrative examples, initial correspondence 141 may only be identified between a portion of first features 136 and a portion of second features 138.

Initial correspondence 141 is identified using initial transformation 142 for registering first image 132 with second image 134. In one illustrative example, image registration module 126 may identify initial transformation 142 using first features 136, second features 138, and a random sample consensus (RANSAC) algorithm.

Initial transformation 142 may be an orthographic transformation in these depicted examples. In other words, registering first image 132 with second image 134 using initial transformation 142 translates and/or rotates first image 132 to align first features 136 in first image 132 with second features 138 in second image 134.

As one illustrative example, image registration module 126 uses initial transformation 142, first image 132, second image 134, and an algorithm for matching first features 136 with second features 138 to identify initial correspondence 141. In this illustrative example, the algorithm may be, for example, a k-dimensional tree algorithm, a nearest neighbor matching algorithm, or some other suitable type of algorithm.

Further, image registration module 126 is configured to form minimum spanning tree (MST) 146 using first features 136. Minimum spanning tree 146 has nodes 148 and number of branches 150.

Each node in nodes 148 is a feature in first features 136. In this manner, all of first features 136 are represented in minimum spanning tree 146 in these illustrative examples. Each branch in number of branches 150 connects two nodes in nodes 148. Further, each branch in number of branches 150 has weight 152. In these illustrative examples, weight 152 for each branch is a distance in pixels between the two nodes in nodes 148 connected by the branch.

Image registration module 126 is configured to remove any branch in number of branches 150 having weight 152 greater than selected weight 154 from minimum spanning tree 146. When all branches having weight 152 greater than selected weight 154 are removed from minimum spanning tree 146, clusters 156 of first features 136 are formed in minimum spanning tree 146.

In these illustrative examples, image registration module 126 identifies transformation 155 for each cluster in clusters 156. Transformation 155 is an orthographic transformation for registering each cluster in clusters 156 for first image 132 with a corresponding cluster for second image 134. Transformation 155 may be identified using a least squares algorithm in these depicted examples.

Cluster 157 is an example of one of clusters 156. Cluster 157 comprises first group of features 159. "A group of items", as used herein, means one or more items. For example, "a group of features" is one or more features.

Image registration module 126 identifies corresponding cluster 161 for cluster 157. In particular, image registration module 126 identifies second group of features 163 from second features 138 that correspond to first group of features 159 based on initial correspondence 141. Second group of features 163 forms corresponding cluster 161. With initial correspondence being a one-to-one correspondence, the total number of features in first group of features 159 is the same as the total number of features in second group of features 163.

Image registration module 126 uses transformation 155 identified for cluster 157 to project first group of features 159 onto second image 134. In particular, first group of features 159 is projected onto second image 134 to align first group of features 159 with second group of features 163 in second image 134. First group of features 159 is projected onto coordinate system 160 for second image 134 in these illustrative examples.

Image registration module 126 then identifies first group of locations 158 in second image 134 onto which first group of features 159 is projected. First group of locations 158 is defined using coordinate system 160. Further, second group of features 163 has second group of locations 168 in second image 134 that is also defined using coordinate system 160.

In these depicted examples, image registration module 126 forms set of clusters 162 from clusters 156. "A set of items", as used herein, means zero or more items. "A set of items" may be, for example, a null or empty set.

A cluster in clusters 156, such as cluster 157, is added to set of clusters 162 when projection error 164 is less than selected threshold 170. Projection error 164 is an error for aligning first group of features 159 with second group of features 163 in second image 134. Projection error 164 may be measured in a number of different ways.

For example, projection error 164 may be the sum of the distances between first group of locations 158 for first group of features 159 in cluster 157 and second group of locations 168 for second group of features 163 in corresponding cluster 161. In some illustrative examples, projection error 164 may be the sum of the distances between first group of locations 158 and second group of locations 168 divided by the total number of features in first group of features 159.

Image registration module 126 uses set of clusters 162 to identify final transformation 172 for registering first image 132 with second image 134. In particular, image registration module 126 uses the features included in set of clusters 162 and a random sample consensus (RANSAC) algorithm to identify final transformation 172 for registering first image 132 with second image 134.

In these illustrative examples, image registration module 126 registers first image 132 with second image 134 using final transformation 172. Final transformation 172 is an orthographic transformation in these examples. In other words, final transformation 172 aligns first image 132 with second image 134 using only translation and/or rotation.

Final transformation 172 is a refined transformation as compared to initial transformation 142 in these examples. In other words, registration of first image 132 with second image 134 using final transformation 172 may be performed with desired level of accuracy 174. Desired level of accuracy 174 may be greater than a level of accuracy for registering first image 132 with second image 134 using initial transformation 142.

In this manner, image processing module 104 provides a system for registering images 110 generated by sensor system 102 with desired level of accuracy 174. Desired level of accuracy 174 may be greater than the level of accuracy for currently-available methods for registering images.

The illustration of image processing environment 100 in FIG. 1 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, feature detection module 124 may be part of image registration module 126. In other illustrative examples, first image 132 may be registered with a reference image generated by a sensor system other than sensor system 102. For example, a second sensor system associated with a second platform may be present in image processing environment 100. Images 110 generated by sensor system 102 may be aligned with a reference image generated using the sensor system.

In still other illustrative examples, initial transformation 142 may be identified using an algorithm other than a random sample consensus algorithm. For example, initial transformation 142 may be identified by matching Fourier contour descriptors for a first number of closed contours identified in first image 132 and a second number of closed contours identified in second image 134.

Figure 2:
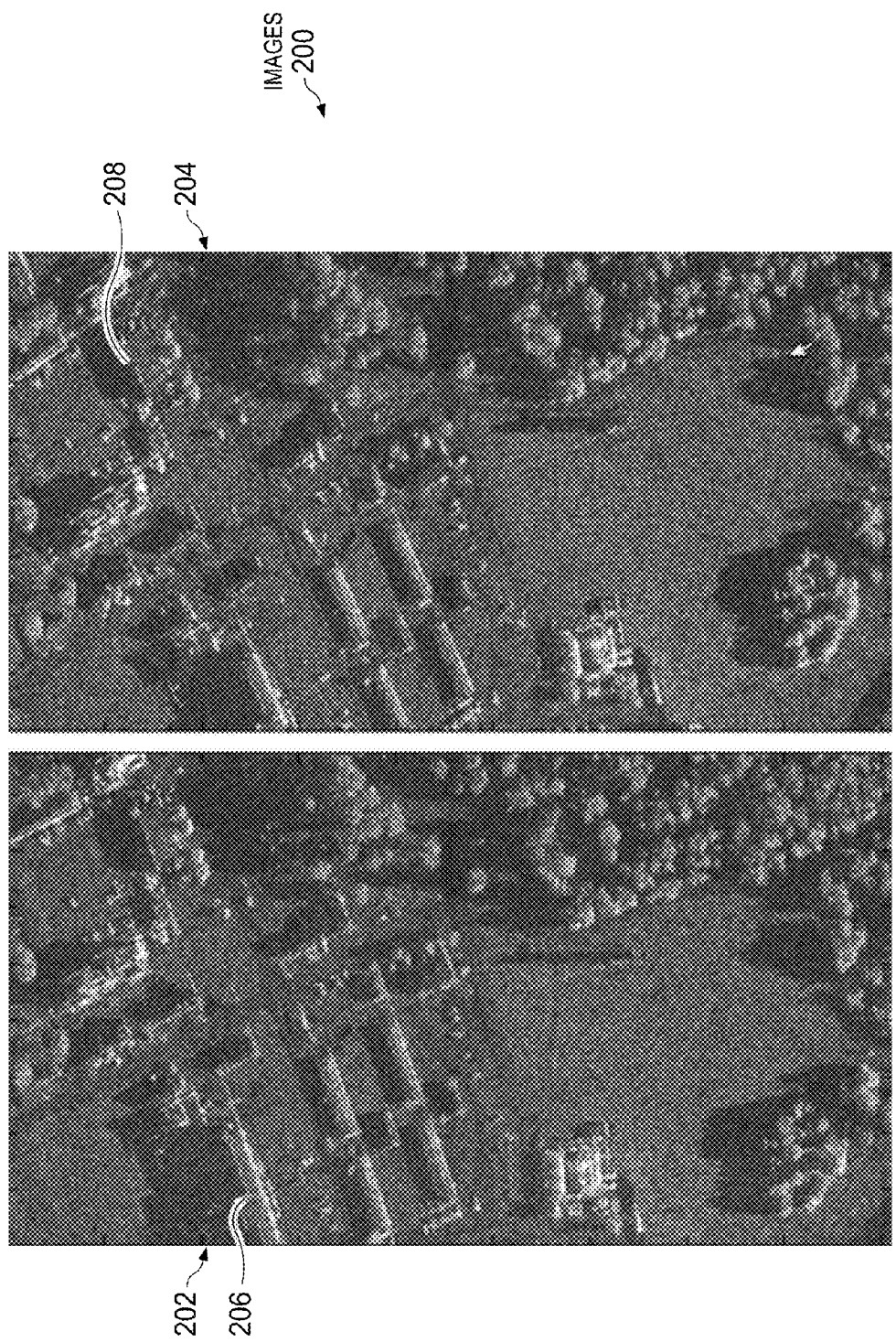
FIG. 2 is an illustration of features identified in orthorectified images in accordance with an advantageous embodiment.

With reference now to FIG. 2, an illustration of features identified in orthorectified images is depicted in accordance with an advantageous embodiment. In this illustrative example, images 200 are examples of orthorectified images 128 in FIG. 1.

Images 200 include first image 202 and second image 204. First image 202 is an example of one implementation for first image 132 in FIG. 1. Second image 204 is an example of one implementation for second image 134 in FIG. 1. As depicted, first features 206 have been identified in first image 202. Further, second features 208 have been identified in second image 204.

Figure 3:
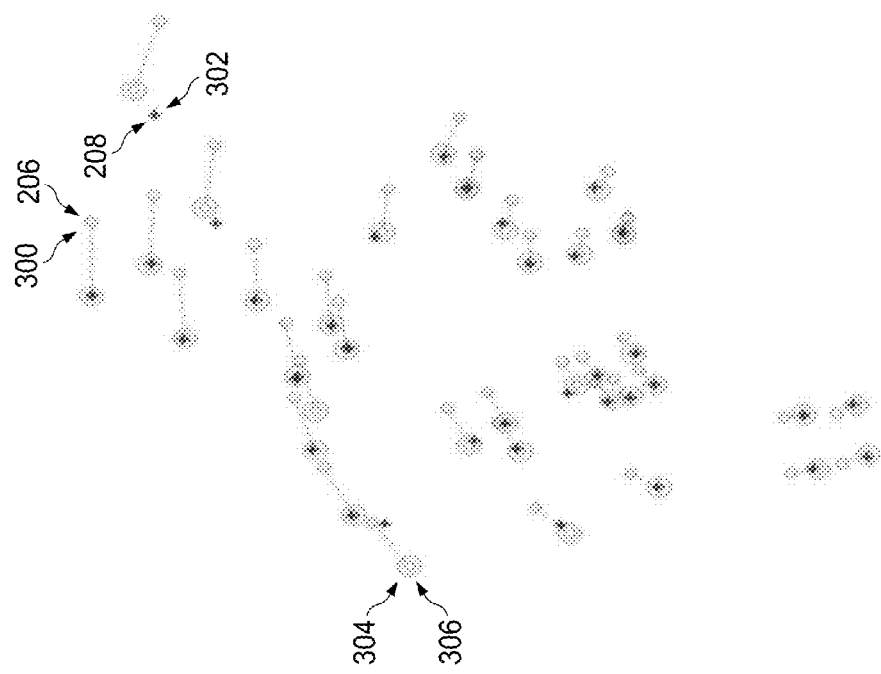
FIG. 3 is an illustration of features identified from a first image and a second image in accordance with an advantageous embodiment.

With reference now to FIG. 3, an illustration of features identified from first image 202 and second image 204 in FIG. 2 is depicted in accordance with an advantageous embodiment. In this illustrative example, first features 206 identified from first image 202 in FIG. 2 are superimposed over second features 208 identified from second image 204 in FIG. 2.

First features 206 are superimposed over second features 208 with respect to a coordinate system for second image 204. In particular, first features 206 are in locations 300 with respect to a coordinate system for second image 204 prior to first image 202 being registered with second image 204. Further, second features 208 are in locations 302 with respect to the coordinate system for second image 204.

In this illustrative example, projected features 304 are the projections of first features 206 onto the coordinate system for second image 204 performed using, for example, final transformation 172 in FIG. 1. In other words, projected features 304 are first features 206 after first features 206 have been aligned with second features 208 using final transformation 172.

Projected features 304 are in locations 306. As depicted, the portion of projected features 304 that are in locations 306 that are within a selected distance from locations 302 for the corresponding portion of second features 208 are considered inliers. A level of accuracy for the alignment of first features 206 with second features 208 may be determined based on the percentage of projected features 304 that are inliers.

Figure 4:
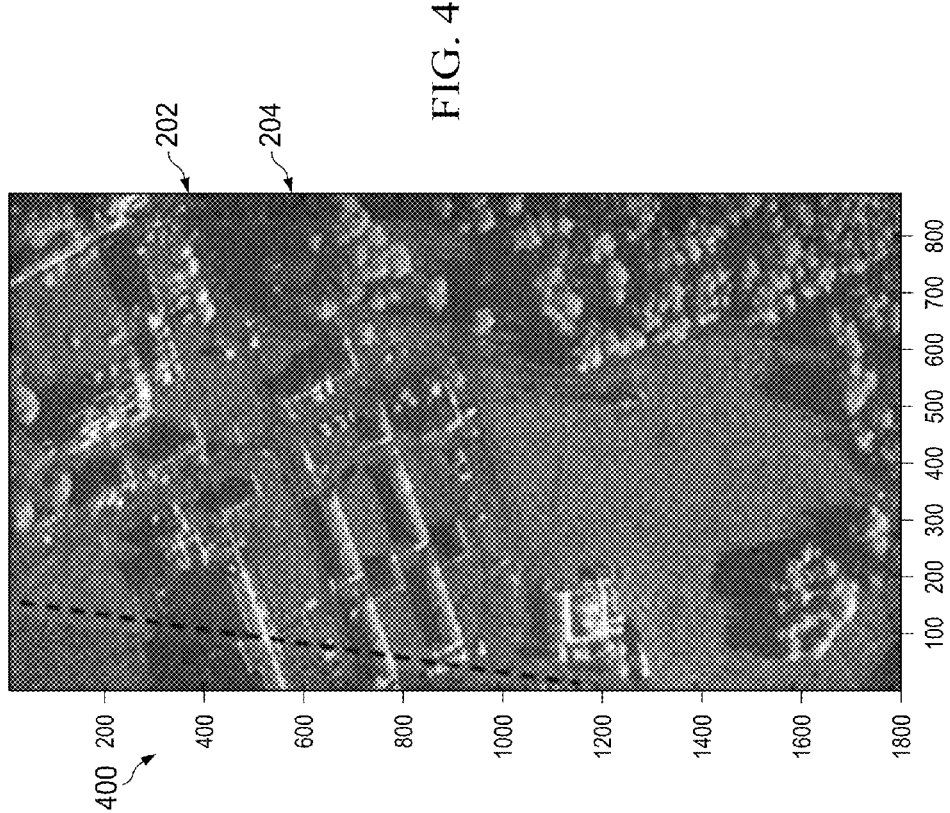
FIG. 4 is an illustration of a first image registered with a second image in accordance with an advantageous embodiment.

With reference now to FIG. 4, an illustration of first image 202 registered with second image 204 from FIG. 2 is depicted in accordance with an advantageous embodiment. In this illustrative example, first image 202 has been registered with second image 204 from FIG. 2 using final transformation 172 in FIG. 1. In this illustrative example, first image 202 is translated, rotated, and then overlaid on second image 204. As depicted, after first image 202 is registered with second image 204, first image 202 and second image 204 share coordinate system 400.

Figure 5:
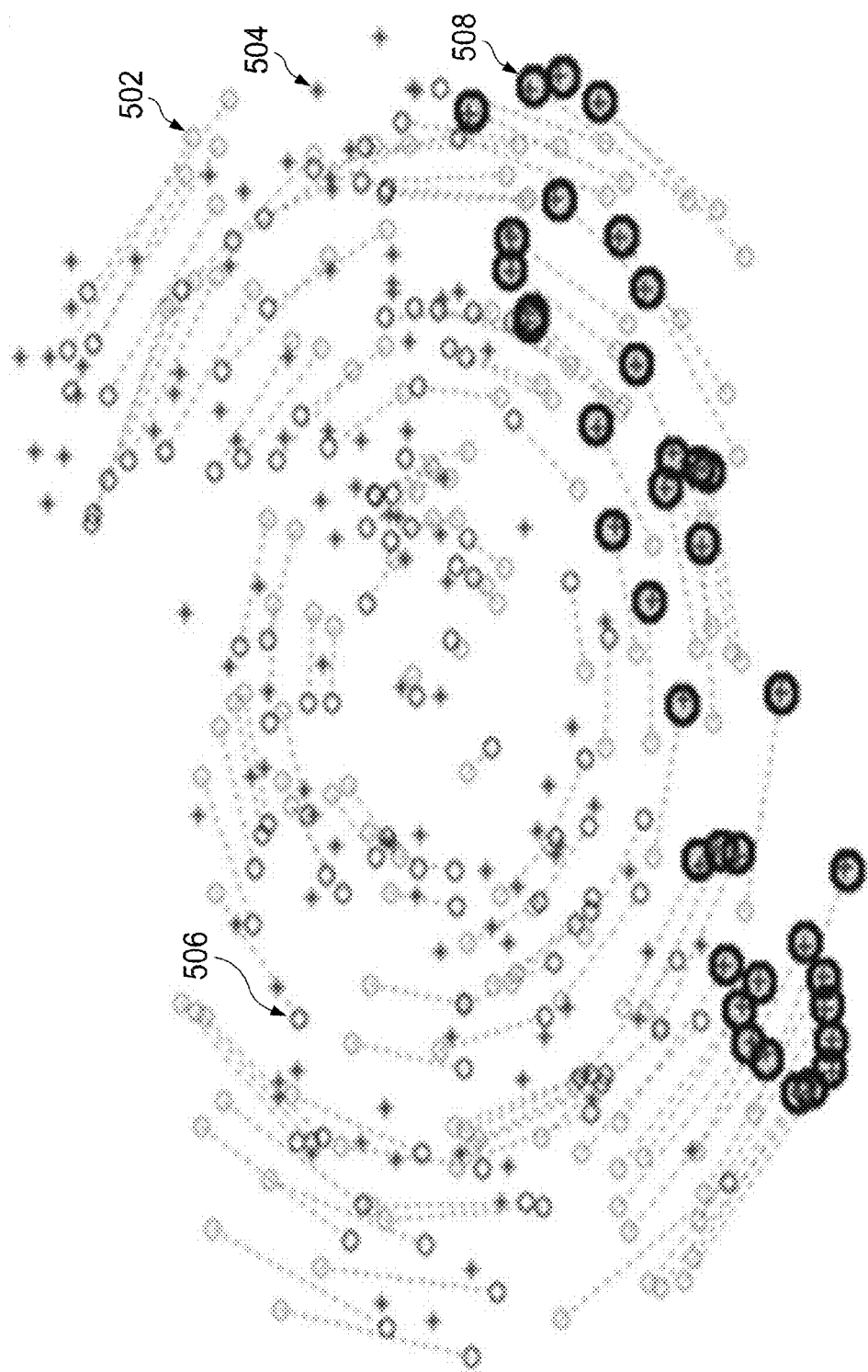
FIG. 5 is an illustration of features identified in images in accordance with an advantageous embodiment.

Turning now to FIG. 5, an illustration of features identified in images is depicted in accordance with an advantageous embodiment. In this illustrative example, features 502 are identified for a first image, such as first image 132 in FIG. 1. Features 504 are identified for a second image, such as second image 134 in FIG. 1.

Additionally, in this depicted example, projected features 506 are the projections of features 502 performed using final transformation 172 in FIG. 1. As depicted in this illustrative example, a portion of projected features 506 are inliers 508.

Figure 6:
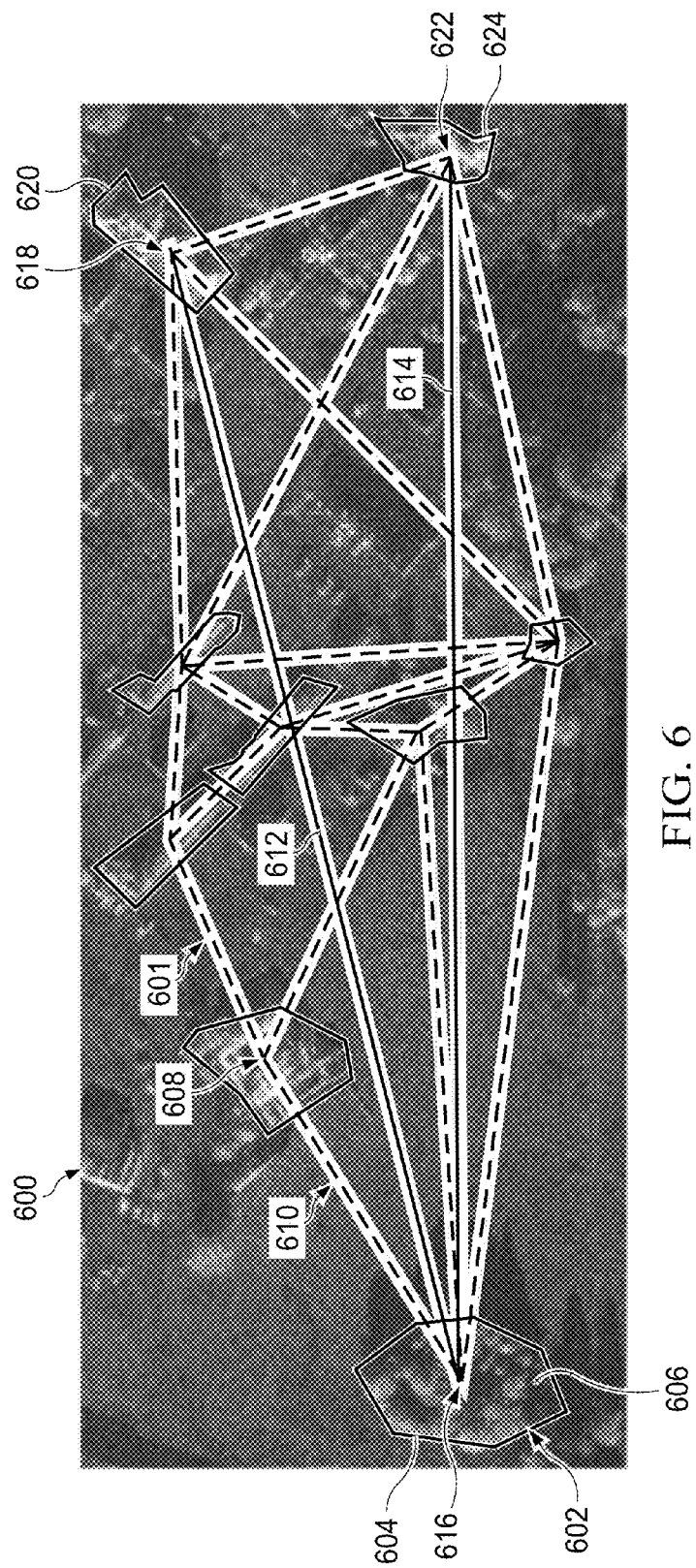
FIG. 6 is an illustration of a feature identified in an image in accordance with an advantageous embodiment.

With reference now to FIG. 6, an illustration of a graph formed using closed contours identified for an image is depicted in accordance with an advantageous embodiment. In this illustrative example, image 600 is an example of one implementation for first image 132 in FIG. 1.

As depicted in this example, graph 601 is formed using closed contours 602 identified in image 600. Closed contours 602 are identified for objects in image 600. For example, closed contour 604 is identified for tree 606 in image 600.

Further, in this illustrative example, centroids 608 have been identified for closed contours 602. Graph 601 is formed by connecting centroids 608 to each other using branches 610. Centroids 608 form the nodes for graph 601.

In this illustrative example, the lengths for branches 610 may be sorted to identify the longest branches in branches 610. In particular, the two longest branches in branches 610 are identified. As depicted, branch 612 and branch 614 are the two longest branches. Branch 612 connects centroid 616 for closed contour 604 to centroid 618 for closed contour 620. Branch 614 connects centroid 616 for closed contour 604 with centroid 622 for closed contour 624.

Closed contours 604, 618 and 624 at the ends of branch 612 and branch 614 and/or branch 612 and branch 614 may be selected for comparison with closed contours identified in a second image. This comparison may be used to identify an initial transformation for aligning image 600 with the second image.

Figure 7:
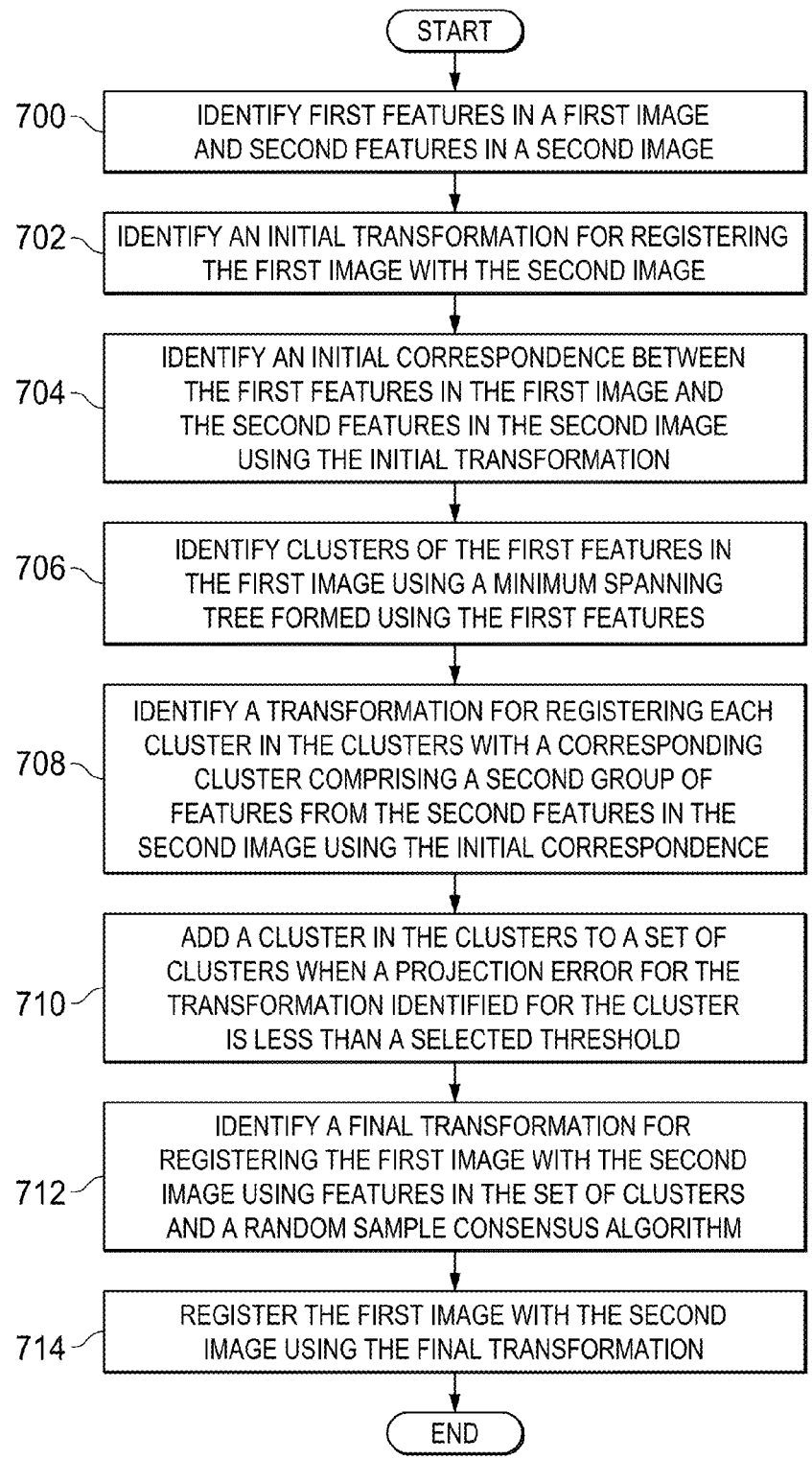
FIG. 7 is an illustration of a flowchart of a process for registering images in accordance with an advantageous embodiment.

With reference now to FIG. 7, an illustration of a flowchart of a process for registering images is depicted in accordance with an advantageous embodiment. The process illustrated in FIG. 7 may be implemented using image processing module 104 in FIG. 1.

The process begins by identifying first features in a first image and second features in a second image (operation 700). In this illustrative example, the first image and the second image are orthorectified images. These orthorectified images may be generated by, for example, image adjustment module 122 in FIG. 1, using images received from a sensor system, such as sensor system 102 in FIG. 1. The images received from the sensor system are synthetic aperture radar images in this illustrative example.

The process then identifies an initial transformation for registering the first image with the second image (operation 702). In this illustrative example, operation 702 may be performed using the first features identified in the first image, the second features identified in the second image, and a random sample consensus algorithm. The initial transformation may be used to register the first image with the second image by translating and/or rotating the first image to align with the second image. The initial transformation model has an accuracy for aligning the first image with the second image that is less than a desired level of accuracy.

Next, the process identifies an initial correspondence between the first features in the first image and the second features in the second image using the initial transformation (operation 704). The process then identifies clusters of the first features in the first image using a minimum spanning tree formed using the first features (operation 706). Each cluster in the clusters identified comprises a first group of features from the first features.

Thereafter, the process identifies a transformation for registering each cluster in the clusters with a corresponding cluster comprising a second group of features from the second features in the second image using the initial correspondence (operation 708). In operation 708, the second group of features that form the corresponding cluster may be identified based on the initial correspondence.

Further, in operation 708, the transformation projects the first group of features in a cluster onto the second image to align the first group of features in the cluster with the second group of features in the corresponding cluster in the second image. Operation 708 may be performed using a least squares algorithm to identify the best transformation for aligning the first group of features with the second group of features in the second image.

The process adds a cluster in the clusters to a set of clusters when a projection error for the transformation identified for the cluster is less than a selected threshold (operation 710). In this manner, in performing operation 710, a set of clusters is identified from the clusters of the first features in the first image. In operation 710, the projection error identifies the error in aligning the first group of features with the second group of features in the second image when the first group of features is projected onto the second image using the transformation identified for the cluster comprising the first group of features.

Thereafter, the process identifies a final transformation for registering the first image with the second image using features in the set of clusters and a random sample consensus algorithm (operation 712). The process then registers the first image with the second image using the final transformation (operation 714), with the process terminating thereafter.

Figure 8:
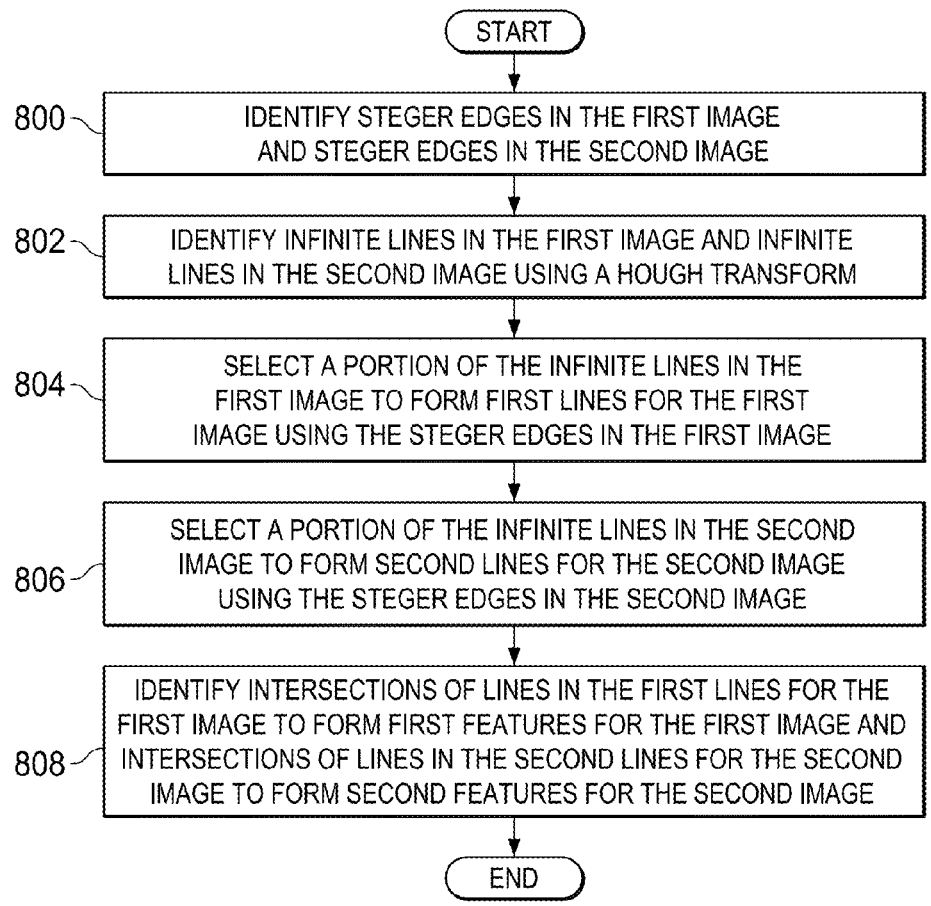
FIG. 8 is an illustration of a flowchart of a process for identifying features in an image in accordance with an advantageous embodiment.

With reference now to FIG. 8, an illustration of a flowchart of a process for identifying features in an image is depicted in accordance with an advantageous embodiment. The process illustrated in FIG. 8 may be used to implement operation 700 in FIG. 7.

The process begins by identifying Steger edges in the first image and Steger edges in the second image (operation 800). Steger edges are edges identified using the Steger algorithm. The process then identifies infinite lines in the first image and infinite lines in the second image using a Hough transform (operation 802).

Thereafter, the process selects a portion of the infinite lines in the first image to form first lines for the first image using the Steger edges in the first image (operation 804). The process selects a portion of the infinite lines in the second image to form second lines for the second image using the Steger edges in the second image (operation 806).

In operation 804 and operation 806, the selection of the portion of the infinite lines in the first image and the infinite lines in the second image may be performed in a similar manner. In particular, an infinite line is selected when a desired amount of alignment between the infinite line and a Steger edge is present.

Next, the process identifies intersections of lines in the first lines for the first image to form first features for the first image and intersections of lines in the second lines for the second image to form second features for the second image (operation 808), with the process terminating thereafter. The first features and the second features may be referred to as point features in this illustrative example.

With reference now to FIG. 9, an illustration of a flowchart of a process for identifying an initial transformation for registering a first image with a second image is depicted in accordance with an advantageous embodiment. The process illustrated in FIG. 9 may be used in implementing operation 702 in FIG. 7.

The process begins by identifying first closed contours in the first image and second closed contours in the second image (operation 900). The first closed contours and the second closed contours are identified for objects that are present in the first image and the second image, respectively.

Operation 900 may be performed using currently-available methods for identifying closed contours, such as, for example, a linking algorithm for forming a chain of connected pixels. In these illustrative examples, a closed contour is a continuous closed curve. In other illustrative examples, a closed contour may be a discontinuous closed curve. In other words, gaps may be present in the closed curve.

Next, the process identifies first centroids for the first closed contours and second centroids for the second closed contours (operation 902). The process then connects the first centroids to each other using first branches to form a first graph (operation 904). The process connects the second centroids to each other using second branches to form a second graph (operation 906).

Thereafter, the process identifies and sorts lengths of the first branches and lengths of the second branches (operation 908). The process then selects a number of the first branches having the longest lengths of the first branches to form first selected branches (operation 910).

In operation 910, the two branches having the longest lengths may be selected. In some illustrative examples, the three branches having the longest lengths may be selected. Of course, any number of the first branches having the longest lengths may be selected.

The process then selects each branch in the second branches having a length greater than a selected length to form second selected branches (operation 912). The selected length is shorter than the length of the shortest branch in the first selected branches in this illustrative example. In this manner, the number of branches in the second selected branches may be greater than the number of branches in the first selected branches.

Next, the process identifies a number of combinations of the second selected branches (operation 914). In operation 914, each combination of the second selected branches has a number of branches equal to the number of branches in the first selected branches. The process selects a particular combination of branches in the number of combinations for processing (operation 916).

The process then compares a first number of properties for the first selected branches with a second number of properties for the particular combination of branches selected to identify a matching score (operation 918). The first number of properties and the second number of properties may include at least one of, for example, without limitation, a length of the branches, a number of angles between branches, Fourier contour descriptors for the closed contours at the ends of the branches, and other suitable types of properties.

Fourier contour descriptors comprise numbers that describe a shape of a closed contour and do not vary substantially when the shape is translated and/or rotated. Further, these descriptors do not vary substantially with respect to scale.

In operation 918, the comparison between these properties may be performed using a matching algorithm that calculates the matching score. The matching score measures how closely the first number of properties and the second number of properties match. In other words, the matching score measures how similar the first number of properties for the first selected branches is to the second number of properties for the particular combination of branches selected.

The matching algorithm for calculating the matching score may comprise the following equations:

$$D = E + \Sigma S_i, \text{ and}$$

$$E = \Sigma p_j,$$

where D is the matching score; E is a sum of the distances between locations of the first centroids for the first closed contours at the ends of the first selected branches and the locations of the corresponding second centroids for the second closed contours at the ends of the branches in the particular combination of branches selected; $S_i$ is a difference score between the Fourier contour descriptors for the first closed contours at the ends of the first selected branches and the Fourier contour descriptors for the second closed contours at the ends of the branches in the particular combination of branches selected; and p is a distance between a location for the jth first centroid in the first image and a location for the corresponding second centroid in the second image.

The process then determines whether the matching score is greater than a selected threshold (operation 920). If the matching score is greater than the selected threshold, the process identifies a transformation for aligning the first closed contours at the ends of the first selected branches with the second closed contours at the ends of the branches in the particular combination of branches selected (operation 922), with the process terminating thereafter. This transformation is the initial transformation for registering the first image with the second image identified in operation 702 in FIG. 7.

With reference again to operation 920, if the matching score is less than the selected threshold, the process determines whether any additional unprocessed combinations in the number of combinations identified are present (operation 924). If no additional unprocessed combinations are present, the process terminates. Otherwise, the process returns to operation 916 as described above.

Figure 10:
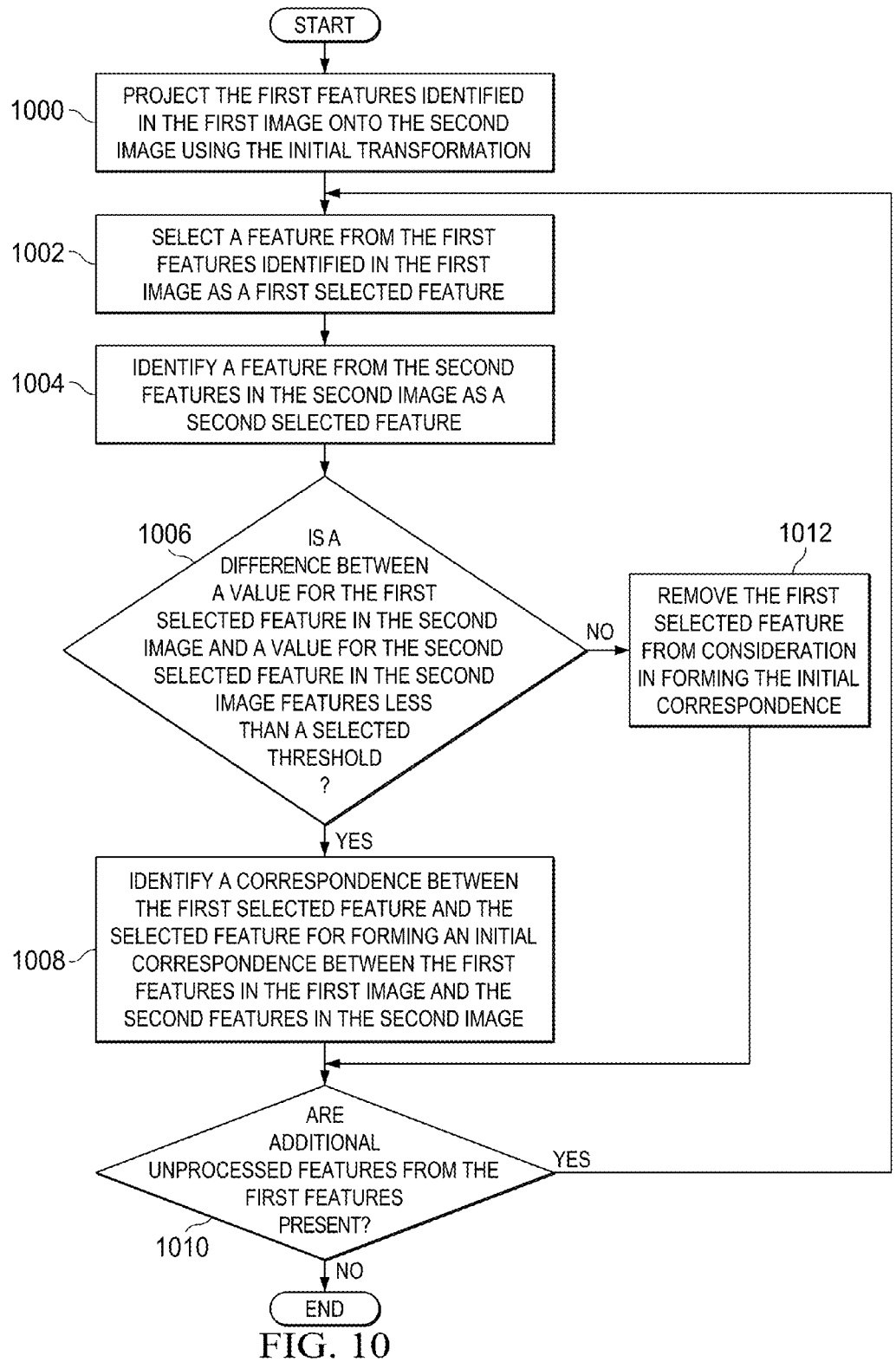
FIG. 10 is an illustration of a flowchart of a process for identifying an initial correspondence between first features in a first image and second features in a second image in accordance with an advantageous embodiment.

With reference now to FIG. 10, an illustration of a flowchart of a process for identifying an initial correspondence between first features in a first image and second features in a second image is depicted in accordance with an advantageous embodiment. The process illustrated in FIG. 10 may be used to implement operation 704 in FIG. 7.

The process begins by projecting the first features identified in the first image onto the second image using the initial transformation (operation 1000). The process then selects a feature from the first features identified in the first image as a first selected feature (operation 1002).

Next, the process identifies a feature from the second features in the second image as a second selected feature (operation 1004). In operation 1004, the feature identified from the second features as the second selected feature is the feature having a location in the second image that is closer to a location of the selected feature projected onto the second image than any of the locations of the other features in the second features.

The process then determines whether a difference between a value for the first selected feature in the second image and a value for the second selected feature in the second image features is less than a selected threshold (operation 1006). When the first selected feature and the second selected feature are point features, the values for these features may be the values of the pixels at the locations of these features.

If the difference is less than the selected threshold, the process identifies a correspondence between the first selected feature and the selected feature for forming an initial correspondence between the first features in the first image and the second features in the second image (operation 1008).

The process then determines whether any additional unprocessed features from the first features are present (operation 1010). If no additional unprocessed features are present, the process terminates. Otherwise, the process returns to operation 1002 as described above.

With reference again to operation 1006, if the difference is not less than the selected threshold, the process removes the first selected feature from consideration in forming the initial correspondence (operation 1012). In this manner, not all of the first features identified in the first image may be identified as having a corresponding feature in the second features in the second image. Thereafter, the process proceeds to operation 1010 as described above.

Figure 11:
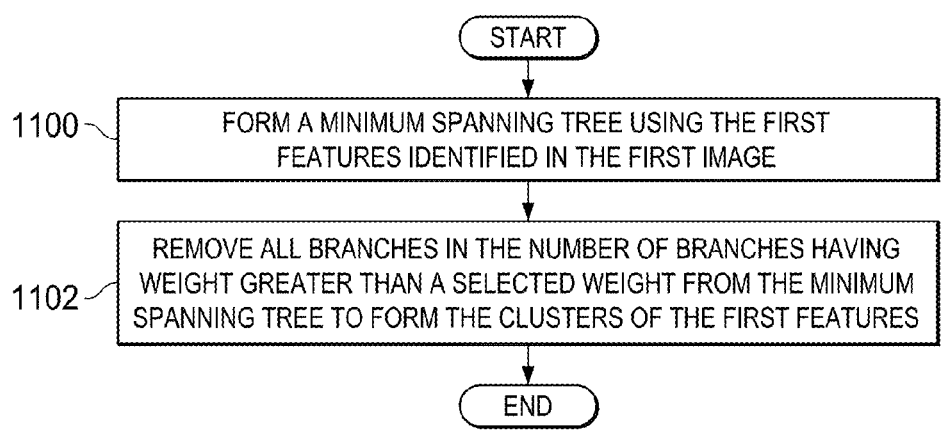
FIG. 11 is an illustration of a flowchart of a process for identifying clusters of first features identified in a first image in accordance with an advantageous embodiment.

With reference now to FIG. 11, an illustration of a flowchart of a process for identifying clusters of first features identified in a first image is depicted in accordance with an advantageous embodiment. The process illustrated in FIG. 11 may be used to implement operation 706 in FIG. 7.

The process begins by forming a minimum spanning tree using the first features identified in the first image (operation 1100). The minimum spanning tree comprises nodes and a number of branches. Each node in the nodes is a feature in the first features, and each branch in the number of branches has a weight. The process then removes all branches in the number of branches having a weight greater than a selected weight from the minimum spanning tree to form the clusters of the first features (operation 1102), with the process terminating thereafter.

Figure 12:
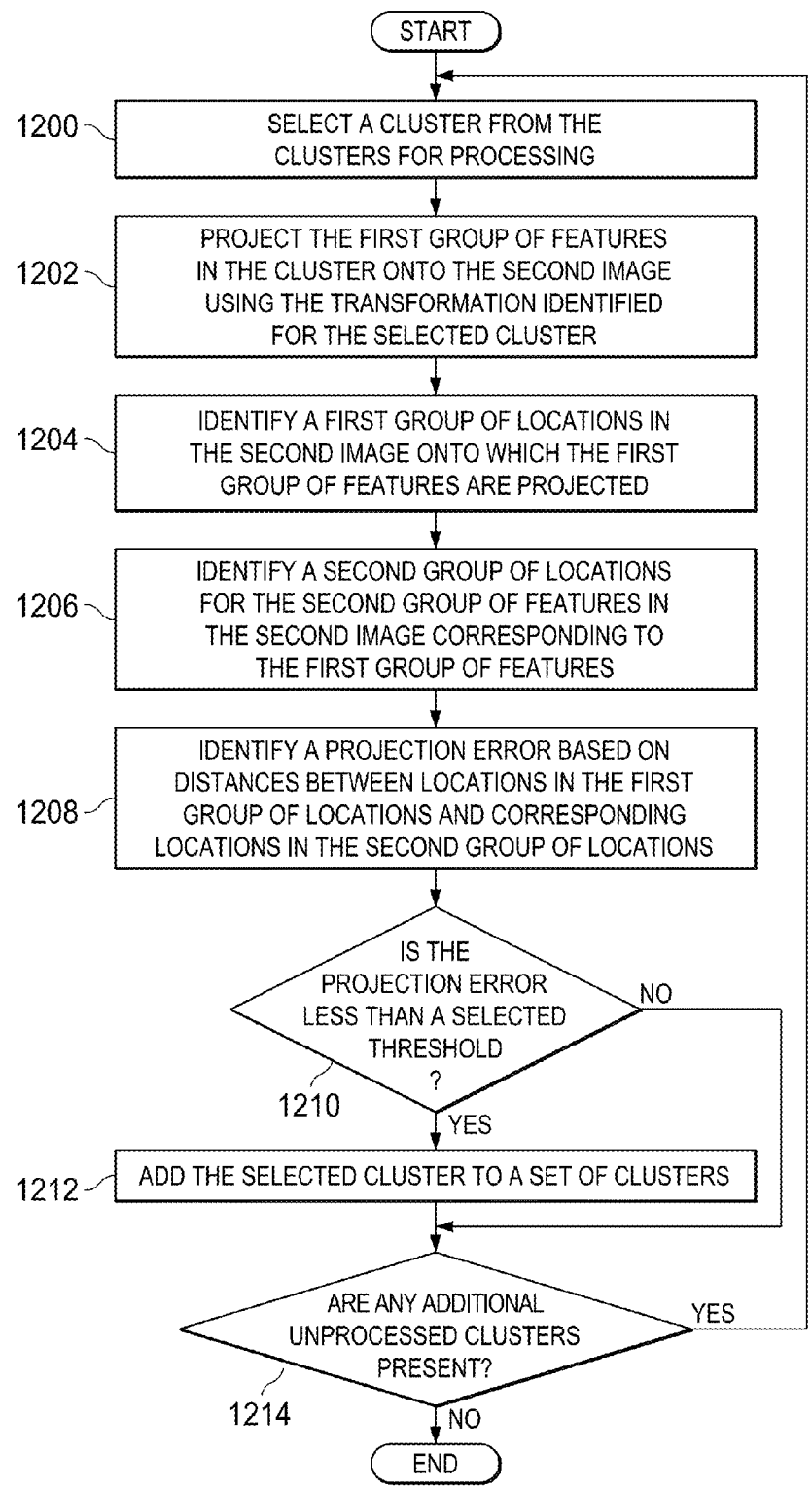
FIG. 12 is an illustration of a flowchart of a process for identifying a set of clusters from clusters of first features in a first image in accordance with an advantageous embodiment.

With reference now to FIG. 12, an illustration of a flowchart of a process for identifying a set of clusters from clusters of first features in a first image is depicted in accordance with an advantageous embodiment. The process illustrated in FIG. 12 may be used to implement operation 710 in FIG. 7.

The process begins by selecting a cluster from the clusters for processing (operation 1200). The process then projects the first group of features in the cluster onto the second image using the transformation identified for the selected cluster (operation 1202). The process identifies a first group of locations in the second image onto which the first group of features are projected (operation 1204). The first group of locations is defined with respect to a coordinate system for the second image.

The process identifies a second group of locations for the second group of features in the second image corresponding to the first group of features (operation 1206). The process then identifies a projection error based on distances between locations in the first group of locations and corresponding locations in the second group of locations (operation 1208).

Next, the process determines whether the projection error is less than a selected threshold (operation 1210). If the projection error is less than selected threshold, the process adds the selected cluster to a set of clusters (operation 1212). The process then determines whether any additional unprocessed clusters are present (operation 1214). If no additional unprocessed clusters are present, the process terminates. Otherwise, the process returns to operation 1200 as described above.

With reference again to operation 1210, if the projection error is not less than the selected threshold, the process proceeds to operation 1214 as described above.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Turning now to FIG. 13, an illustration of a data processing system is depicted in accordance with an advantageous embodiment. In this illustrative example, data processing system 1300 may be used to implement one or more of number of computers 120 in computer system 118 in FIG. 1.

As depicted, data processing system 1300 includes communications fabric 1302, which provides communications between processor unit 1304, memory 1306, persistent storage 1308, communications unit 1310, input/output (I/O) unit 1312, and display 1314.

Processor unit 1304 serves to execute instructions for software that may be loaded into memory 1306. Processor unit 1304 may be a number of processors, a multi-processor core, or some other type of processor, depending on the particular implementation. A number, as used herein with reference to an item, means one or more items. Further, processor unit 1304 may be implemented using a number of heterogeneous processor systems in which a main processor is present with secondary processors on a single chip. As another illustrative example, processor unit 1304 may be a symmetric multi-processor system containing multiple processors of the same type.

Memory 1306 and persistent storage 1308 are examples of storage devices 1316. A storage device is any piece of hardware that is capable of storing information, such as, for example, without limitation, data, program code in functional form, and/or other suitable information either on a temporary basis and/or a permanent basis. Storage devices 1316 may also be referred to as computer readable storage devices in these examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these examples, provides for communications with other data processing systems or devices. In these examples, communications unit 1310 is a network interface card. Communications unit 1310 may provide communications through the use of either or both physical and wireless communications links.

Input/output unit 1312 allows for input and output of data with other devices that may be connected to data processing system 1300. For example, input/output unit 1312 may provide a connection for user input through a keyboard, a mouse, and/or some other suitable input device. Further, input/output unit 1312 may send output to a printer. Display 1314 provides a mechanism to display information to a user.

Instructions for the operating system, applications, and/or programs may be located in storage devices 1316, which are in communication with processor unit 1304 through communications fabric 1302. In these illustrative examples, the instructions are in a functional form on persistent storage 1308. These instructions may be loaded into memory 1306 for execution by processor unit 1304. The processes of the different embodiments may be performed by processor unit 1304 using computer-implemented instructions, which may be located in a memory, such as memory 1306.

These instructions are referred to as program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these examples. In one example, computer readable media 1320 may be computer readable storage media 1324 or computer readable signal media 1326.

Computer readable storage media 1324 may include, for example, an optical or magnetic disk that is inserted or placed into a drive or other device that is part of persistent storage 1308 for transfer onto a storage device, such as a hard drive, that is part of persistent storage 1308. Computer readable storage media 1324 also may take the form of a persistent storage, such as a hard drive, a thumb drive, or a flash memory, that is connected to data processing system 1300. In some instances, computer readable storage media 1324 may not be removable from data processing system 1300.

In these examples, computer readable storage media 1324 is a physical or tangible storage device used to store program code 1318 rather than a medium that propagates or transmits program code 1318. Computer readable storage media 1324 is also referred to as a computer readable tangible storage device or a computer readable physical storage device. In other words, computer readable storage media 1324 is media that can be touched by a person.

Alternatively, program code 1318 may be transferred to data processing system 1300 using computer readable signal media 1326. Computer readable signal media 1326 may be, for example, a propagated data signal containing program code 1318. For example, computer readable signal media 1326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1318 may be downloaded over a network to persistent storage 1308 from another device or data processing system through computer readable signal media 1326 for use within data processing system 1300. For instance, program code stored in a computer readable storage medium in a server data processing system may be downloaded over a network from the server to data processing system 1300. The data processing system providing program code 1318 may be a server computer, a client computer, or some other device capable of storing and transmitting program code 1318.

The different components illustrated for data processing system 1300 are not meant to provide architectural limitations to the manner in which different embodiments may be implemented. The different advantageous embodiments may be implemented in a data processing system including components in addition to or in place of those illustrated for data processing system 1300. Other components shown in FIG. 13 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1304 may take the form of a hardware unit that has circuits that are manufactured or configured for a particular use. This type of hardware may perform operations without needing program code to be loaded into a memory from a storage device to be configured to perform the operations.

For example, when processor unit 1304 takes the form of a hardware unit, processor unit 1304 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1318 may be omitted, because the processes for the different embodiments are implemented in a hardware unit.

In still another illustrative example, processor unit 1304 may be implemented using a combination of processors found in computers and hardware units. Processor unit 1304 may have a number of hardware units and a number of processors that are configured to run program code 1318. With this depicted example, some of the processes may be implemented in the number of hardware units, while other processes may be implemented in the number of processors.

In another example, a bus system may be used to implement communications fabric 1302 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1306, or a cache, such as found in an interface and memory controller hub that may be present in communications fabric 1302.

Thus, the different advantageous embodiments provide a method and apparatus for registering images. In one advantageous embodiment, a method for processing images is provided. Clusters of first features identified in a first image are identified. Each cluster in the clusters comprises a first group of features from the first features. A transformation for registering each cluster in the clusters with a corresponding cluster comprising a second group of features from second features identified in a second image is identified using an initial correspondence between the first features in the first image and the second features in the second image. A set of clusters from the clusters of the first features is identified using the transformation identified for each cluster. A final transformation for registering the first image with the second image is identified using the set of clusters.

The different advantageous embodiments provide a system for registering images with a desired level of accuracy. This desired level of accuracy is provided even in the presence of non-Gaussian noise in the images.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for processing images, the method comprising using a processing module in a computer system for:
   identifying clusters of first features identified in a first image, wherein each cluster in the clusters comprises a first group of features from the first features;
   identifying a transformation for registering each cluster in the clusters with a corresponding cluster comprising a second group of features from second features identified in a second image using an initial correspondence between the first features in the first image and the second features in the second image;
   identifying a set of clusters from the clusters of the first features using the transformation identified for each cluster;

adding a cluster in the clusters to the set of clusters when a projection error for the transformation identified for the cluster is less than a selected threshold; and identifying a final transformation for registering the first image with the second image using the set of clusters.

2. The method of claim 1 further comprising:

identifying the initial correspondence between the first features in the first image and the second features in the second image using an initial transformation for registering the first image with the second image.

3. The method of claim 2 further comprising:

identifying the initial transformation for registering the first image with the second image using the first features identified in the first image, the second features identified in the second image, and a random sample consensus algorithm.

4. The method of claim 2 further comprising:

identifying a first number of closed contours in the first image and a second number of closed contours in the second image; and identifying an initial transformation for registering the first image with the second image using the first number of closed contours, the second number of closed contours, and a matching algorithm.

5. The method of claim 1, wherein the step of identifying the clusters of the first features identified in the first image comprises:

forming a minimum spanning tree using the first features, wherein the minimum spanning tree comprises nodes and a number of branches in which each node in the nodes is a feature in the first features and each branch in the number of branches has a weight; and removing any branch in the number of branches from the minimum spanning tree when the weight of the any branch is greater than a selected weight to form the clusters of the first features, wherein each cluster in the clusters comprises the first group of features from the first features.

6. The method of claim 1, wherein the step of identifying the transformation for registering each cluster in the clusters with the corresponding cluster comprising the second group of features from the second features identified in the second image using the initial correspondence between the first features in the first image and the second features in the second image comprises:

identifying features from the second features identified in the second image that correspond to the first group of features in a cluster in the clusters as the second group of features using the initial correspondence, wherein the second group of features form the corresponding cluster; and identifying the transformation for registering the cluster with the corresponding cluster using a least squares algorithm, wherein the transformation projects the first group of features in the cluster onto the second image to align the first group of features in the cluster with the second group of features in the corresponding cluster.

7. The method of claim 6, wherein the step of identifying the set of clusters from the clusters using the transformation identified for each cluster comprises:

identifying a first group of locations in the second image onto which the first group of features is projected using the transformation;

identifying the projection error using distances between the first group of locations for the first group of features and a second group of locations in the second image for the second group of features; and adding the cluster to the set of clusters when the projection error is less than a selected threshold for aligning the first group of features in the cluster with the second group of features in the corresponding cluster.

8. The method of claim 1, wherein the step of identifying the final transformation for registering the first image with the second image using the set of clusters comprises:

identifying the final transformation for registering the first image with the second image using features in the set of clusters and a random sample consensus algorithm.

9. The method of claim 1 further comprising:

identifying the first features in the first image and the second features in the second image.

10. The method of claim 9, wherein the step of identifying the first features in the first image and the second features in the second image comprises:

identifying first lines in the first image and second lines in the second image using a line detection algorithm; and identifying intersections of lines in the first lines as the first features and intersections of lines in the second lines as the second features.

11. The method of claim 9, wherein the step of identifying the first features in the first image and the second features in the second image is performed using a feature detection module in which the feature detection module uses at least one of a Steger algorithm, a Canny line detection algorithm, an edge detection algorithm, a Hough transform, a scale-invariant feature transform, a speeded up robust features detector, and a Kanade-Lucas-Tomasi transform to identify the first features and the second features.

12. The method of claim 1 further comprising:

registering the first image with the second image using the final transformation to align the first image with the second image with a desired level of accuracy, wherein the first image and the second image are synthetic aperture radar images that are orthorectified.

13. A method for registering images, the method comprising using a processing module in a computer system for:

identifying first features in a first image in the images and second features in a second image in the images;

identifying an initial transformation for registering the first image with the second image using the first features and the second features;

identifying an initial correspondence between the first features in the first image and the second features in the second image using the initial transformation for registering the first image with the second image;

identifying clusters of the first features in the first image using a minimum spanning tree formed using the first features, wherein each cluster in the clusters comprises a first group of features from the first features;

identifying a transformation for registering each cluster in the clusters with a corresponding cluster comprising a second group of features from the second features identified in the second image using the initial correspondence;

adding a cluster in the clusters to a set of clusters when a projection error for the transformation identified for the cluster is less than a selected threshold;

identifying a final transformation for registering the first image with the second image using features in the set of clusters and a random sample consensus algorithm; and registering the first image with the second image using the final transformation.

14. The method of claim 13, wherein the first image is a first synthetic aperture radar image and the second image is a second synthetic aperture radar image in which the first synthetic aperture radar image and the second synthetic aperture radar image are orthorectified and wherein the step of registering the first image with the second image using the final transformation comprises:

performing at least one of a translation and a rotation of the first image using the final transformation to align the first image with the second image with a desired level of accuracy.

15. An apparatus comprising:
an image processing module configured to identify clusters of first features identified in a first image, wherein each cluster in the clusters comprises a first group of features from first features; identify a transformation for registering each cluster in the clusters with a corresponding cluster comprising a second group of features from second features identified in a second image using an initial correspondence between the first features in the first image and the second features in the second image; identify a set of clusters from the clusters of the first features using the transformation identified for each cluster, such that the image processing module is further configured to add a cluster in the clusters to the set of clusters when a projection error for the transformation identified for the cluster is less than a selected threshold; and identify a final transformation for registering the first image with the second image using the set of clusters.

16. The apparatus of claim 15, wherein in being configured to identify the clusters of the first features identified in the first image, the image processing module is configured to form a minimum spanning tree using the first features, wherein the minimum spanning tree comprises nodes and a number of branches in which each node in the nodes is a feature in the first features and each branch in the number of branches has a weight; and remove any branch in the number of branches from the minimum spanning tree when the weight of the any branch is greater than a selected weight to form the clusters of the first features, wherein each cluster in the clusters comprises the first group of features from the first features.

17. The apparatus of claim 15 further comprising:
a feature detection module in the image processing module, wherein the feature detection module is configured to identify the first features in the first image and the second features in the second image.

18. The apparatus of claim 15 further comprising:
a sensor system in communication with the image processing module, wherein the sensor system is configured to generate the first image and the second image.

* * * * *